US012768638B2

(12) United States Patent
Hirano et al.

(10) Patent No.: US 12,768,638 B2
(45) Date of Patent: Oct. 20, 2026

(54) MAGNETIC SENSOR, METHOD FOR DESIGNING THE SAME, AND ASSEMBLY THEREOF

(71) Applicant: TDK Corporation, Tokyo (JP)

(72) Inventors: Hiroyuki Hirano, Tokyo (JP); Teiichiro Oka, Tokyo (JP); Ryoichi Menju, Tokyo (JP); Makoto Takahashi, Tokyo (JP)

(73) Assignee: TDK Corporation, Tokyo (JP)

( * ) Notice: Subject to any disclaimer, the term of this patent is extended or adjusted under 35 U.S.C. 154(b) by 175 days.

(21) Appl. No.: 18/805,854

(22) Filed: Aug. 15, 2024

(65) Prior Publication Data

US 2025/0067550 A1 Feb. 27, 2025

(30) Foreign Application Priority Data

Aug. 25, 2023 (JP) ................................ 2023-137159

(51) Int. Cl.
*G01B 7/30* (2006.01)
*G01D 5/14* (2006.01)
*G01D 5/16* (2006.01)

(52) U.S. Cl.
CPC .............. *G01B 7/30* (2013.01); *G01D 5/145* (2013.01); *G01D 5/16* (2013.01)

(58) Field of Classification Search
CPC . G01B 7/30; G01D 5/145; G01D 5/16; G01D 2205/80
See application file for complete search history.

(56) References Cited

U.S. PATENT DOCUMENTS 11,668,770 B2 * 6/2023 Close .................. G01R 33/038 324/259
2007/0257668 A1 * 11/2007 Nakagawa .............. G01P 3/487 324/207.22
2014/0191625 A1 * 7/2014 Kitamoto .............. G01R 35/00 310/68 B

FOREIGN PATENT DOCUMENTS

JP 2004361119 A 12/2004

* cited by examiner

*Primary Examiner* — Daniel R Miller
(74) *Attorney, Agent, or Firm* — Posz Law Group, PLC

(57) ABSTRACT

When straight lines that are parallel to first to fourth long axes A1 to A4, that have the origin as their ends, and that pass through the first to fourth quadrants are defined as first to fourth imaginary lines B1 to B4, and the angles that the first to fourth imaginary lines make counterclockwise with respect to the boundary line between the first and fourth quadrants are θ1 to θ4, respectively, θ1 is greater than or equal to 0 degrees and less than or equal to 90 degrees, θ2 is greater than or equal to 90 degrees and less than or equal to 180 degrees, θ3 is greater than or equal to 180 degrees and less than or equal to 270 degrees, and θ4 is greater than or equal to 270 degrees and less than or equal to 360 degrees.

20 Claims, 9 Drawing Sheets

| | Comparative Example 1 | Comparative Example 2 | Comparative Example 3 | Working Example 1 |
|---|---|---|---|---|
| | Disk | Disk | Rectangular Parallelepiped x 2 | Rectangular Parallelepiped x 4 |
| Shape of Magnet | 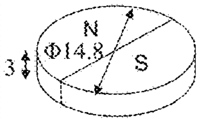  | 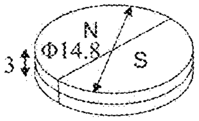  | 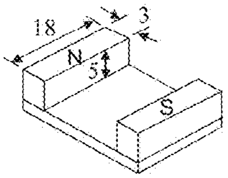  | 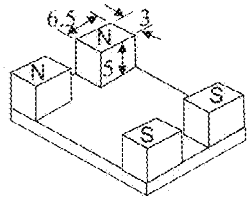  |
| Schematic Shape of Magnetic Flux | 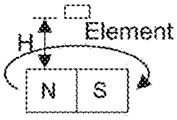  | 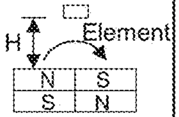  | 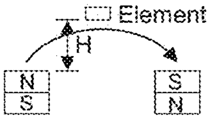  | 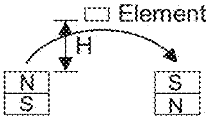  |
| Magnetic Flux Density (Small H) | ○ | ○ | ○ | ○ |
| Magnetic Flux Density (Large H) | × | × | ○ | ○ |
| Angle Measurement Error (Small H) | ○ | △ | △ | × |
| Angle Measurement Error (Large H) | △ | × | △ | ○ |
| Magnet Size (mm) | Φ14.8 - t3.0 | Φ14.8 - t3.0 | 3 x 18 x 5 x 2 pieces | 4 x 6.5 x 5 x 4 pieces |
| Total Magnet Volume ($mm^2$) | 516 | 516 | 540 | 520 |

Fig. 4

MAGNETIC SENSOR, METHOD FOR DESIGNING THE SAME, AND ASSEMBLY THEREOF

FIELD

This application claims the benefit of Japanese Priority Patent Application No. JP2023-137159 filed on Aug. 25, 2023, the entire contents of which are incorporated herein by reference.

The present disclosure relates to a magnetic sensor, a method for designing the same, and an assembly thereof.

BACKGROUND

Magnetic sensors that measure the rotation angle of a rotating body are known. JP 2004-361119 A (hereinbelow referred to as "Patent Document 1") discloses a magnetic sensor that includes four magnets arranged around the periphery of a rotor attached to a rotating shaft and a magnetoresistance effect element arranged away from the magnets. The four magnets are divided into two groups, and the two groups are provided with a magnetic field detection element between them when viewed in a direction parallel to the central axis of rotation. Each of the two groups has two magnets adjacent to each other, with the surfaces of the magnets in one group that face the magnetic field detection element being an N-pole and the surfaces of the magnets in the other group that face the magnetic field detection element being an S-pole. Patent Document 1 describes that a magnetic sensor configured in this manner can reduce detection errors even if the magnets and magnetic field detection element are misaligned in a direction perpendicular to the central axis of rotation due to installation errors.

SUMMARY

Although the magnetic sensor described in Patent Document 1 has the above-mentioned effects, the magnetic flux density applied to the magnetic field detection element is small.

A magnetic sensor comprises first to fourth magnets that are rotatable around a central axis of rotation and that have fixed positional relationships with each other, and a magnetic field detection element. In an XY coordinate system perpendicular to the central axis of rotation and that passes through the origin, the first to fourth magnets are located in first to fourth quadrants, respectively, and the first to fourth magnets include first to fourth element-facing surfaces, respectively, that face the magnetic field detection element, and the first to fourth element-facing surfaces have elongated shapes with first to fourth long axes, respectively. The first element-facing surface and the second element-facing surface have the same polarity, and the third element-facing surface and the fourth element-facing surface have a polarity different from that of the first and second element-facing surfaces. When straight lines that are parallel to the first to fourth long axes, that have the origin as their ends, and that pass through the first to fourth quadrants are defined as first to fourth imaginary lines and the angles that the first to fourth imaginary lines make counterclockwise with respect to the boundary line between the first and fourth quadrants are θ1 to θ4, respectively, θ1 is greater than or equal to 0 degrees and less than or equal to 90 degrees, θ2 is greater than or equal to 90 degrees and less than or equal to 180 degrees, θ3 is greater than or equal to 180 degrees and less than or equal to 270 degrees, and θ4 is greater than or equal to 270 degrees and less than or equal to 360 degrees.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 4 is a schematic diagram showing a comparison of the magnets according to an embodiment and other types of magnets;

DETAILED DESCRIPTION

Figure 1A:
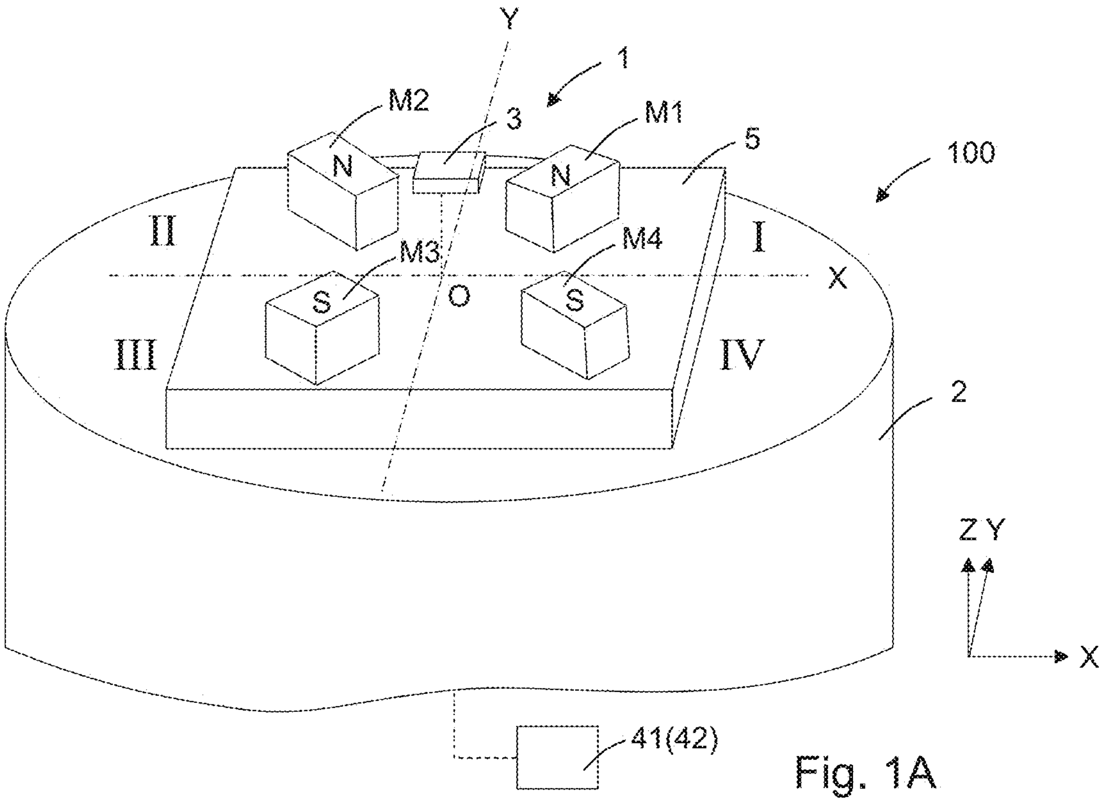
FIGS. 1A and 1B are schematic diagrams of a magnetic sensor according to one example embodiment of the present disclosure.

In the following, some example embodiments and modifications of the technology are described in detail with reference to the accompanying drawings. Note that the following description is directed to illustrative examples of the disclosure and not to be construed as limiting the technology. Factors including, without limitation, numerical values, shapes, materials, components, positions of the components, and how the components are coupled to each other are illustrative only and not to be construed as limiting the technology. Further, elements in the following example embodiments which are not recited in a most-generic independent claim of the disclosure are optional and may be provided on an as-needed basis. The drawings are schematic and are not intended to be drawn to scale. Like elements are denoted with the same reference numerals to avoid redundant descriptions.

An object of the present disclosure is to provide a magnetic sensor in which detection error due to misalignment between a magnet and a magnetic field detection element can be reduced and a larger magnetic field can be applied to the magnetic field detection element.

Figure 1B:
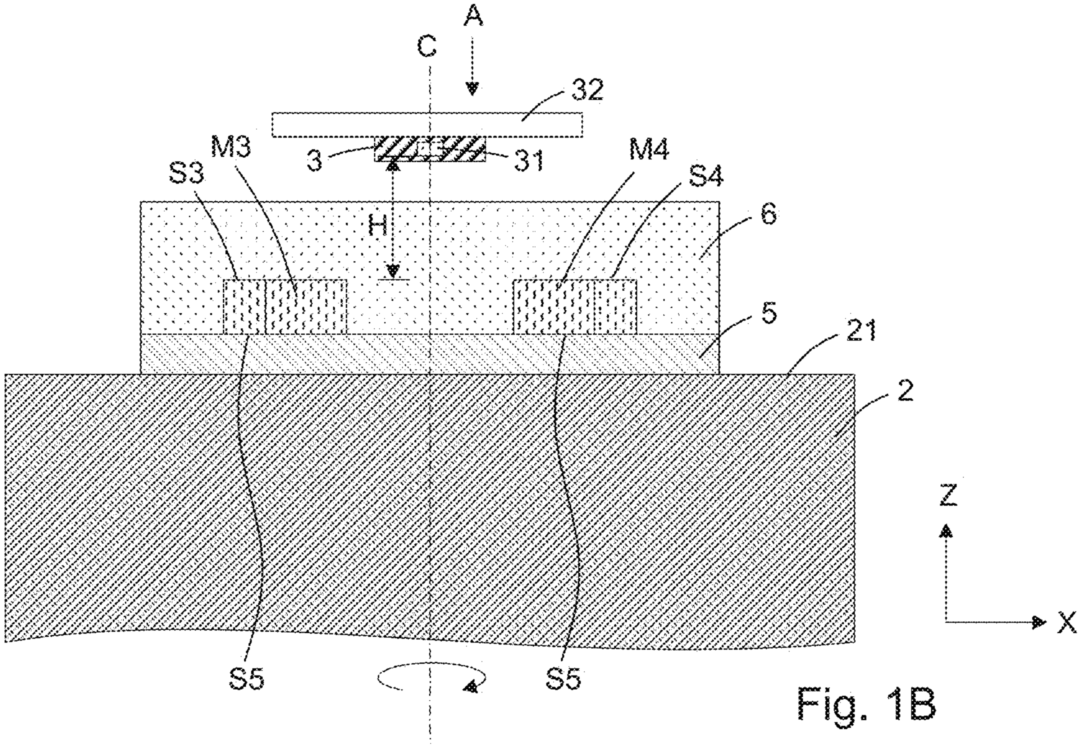
Figure 2:
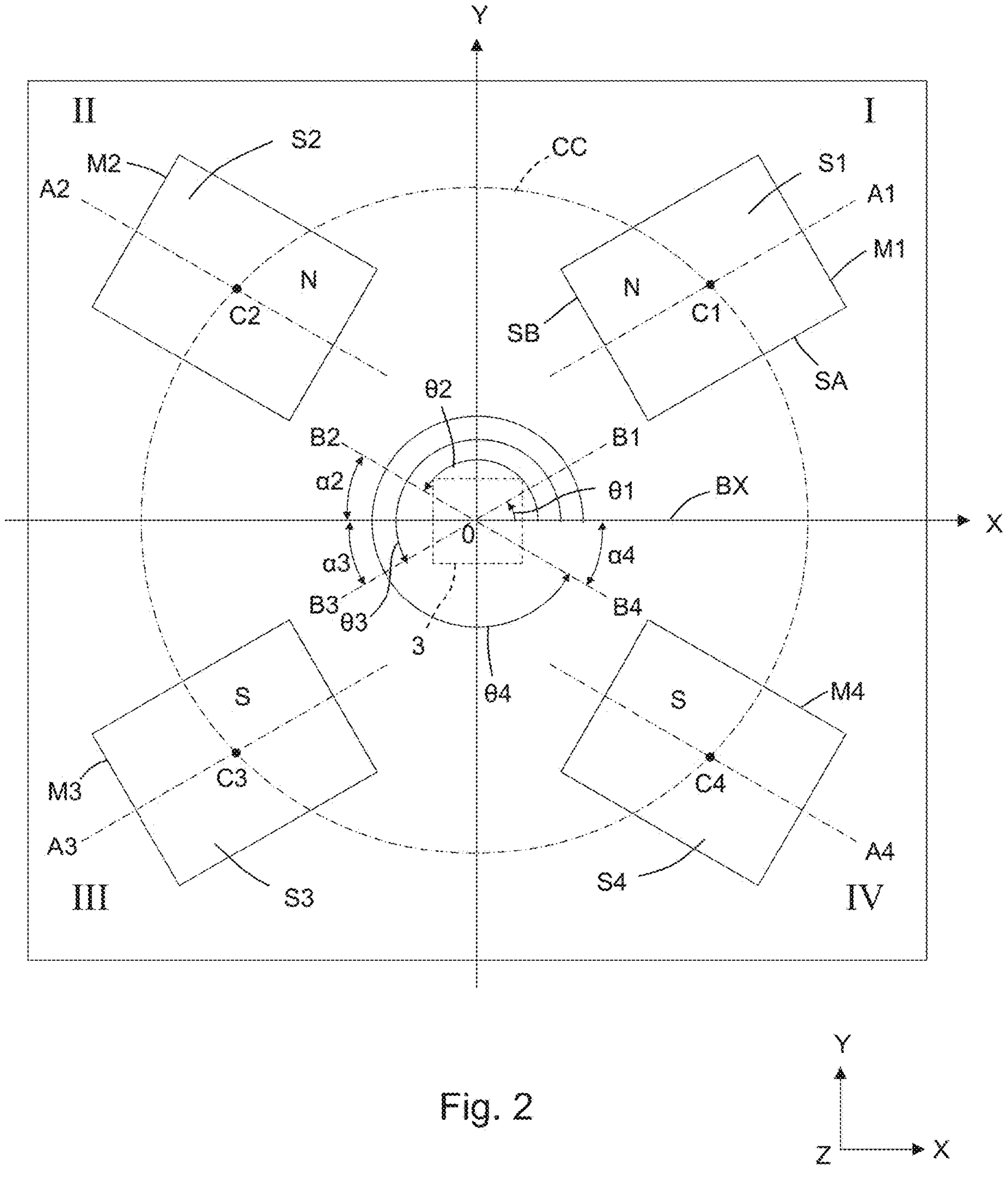
FIG. 2 is a plan view of first to fourth magnets of the magnetic sensor shown in FIG. 1.

An embodiment of a magnetic sensor according to the present disclosure will be described with reference to the drawings. FIGS. 1A, 1B, and 2 are schematic diagrams of magnetic sensor 1 according to one example embodiment of the present disclosure. FIG. 1A shows a perspective view of rotating body 2 and magnetic sensor 1, FIG. 1B shows a side view of rotating body 2, first to fourth magnets M1 to M4, and magnetic field detection element 3, and FIG. 2 shows a plan view of end face 21 of rotating body 2 and first to fourth magnets M1 to M4 as viewed from direction A in FIG. 1B. Rotating body 2 is not particularly limited, but in this embodiment, rotating body 2 is rotating shaft 2 that is connected to motor 41 or engine 42. Motor 41 or engine 42 drives the rotation of rotating shaft 2. Magnetic sensor 1 and motor 41, or magnetic sensor 1 and motor 41, constitute assembly 100.

Configuration of Magnetic Sensor 1

Magnetic sensor 1 includes first to fourth magnets M1 to M4, magnetic field detection element 3, and yoke 5. First to fourth magnets M1 to M4 are supported by yoke 5 and are rotatable around central axis C of rotating shaft 2. Magnetic field detection element 3 is provided away from rotating shaft 2 and first to fourth magnets M1 to M4. First to fourth magnets M1 to M4 may be made of the same material and may have the same shape and size. Yoke 5 is a plate-shaped member made of a soft magnetic material and is fixed to end surface 21 of rotating shaft 2. Yoke 5 increases the strength of the magnetic field generated by first to fourth magnets M1 to M4. Other structures (not shown) may be interposed between yoke 5 and end surface 21 of rotating shaft 2. First to fourth magnets M1 to M4 are sealed with sealing material 6 made of resin. First to fourth magnets M1 to M4 are attracted to yoke 5 by magnetic force and are further held by sealing material 6, so that their relative positions are fixed. Instead of using sealing material 6, first to fourth magnets M1 to M4 may be fixed to yoke 5 with an adhesive.

End surface 21 of rotating shaft 2, i.e., the mounting surface of first to fourth magnets M1 to M4, is parallel to the XY coordinate system. The XY plane of the XY coordinate system is perpendicular to the central axis of rotation C, and the central axis of rotation C passes through the origin 0 of the XY coordinate system. The X-axis and the Y-axis are parallel to end surface 21 of rotating shaft 2 and are perpendicular to each other. The Z-axis coincides with central axis C of rotation of rotating shaft 2 and is perpendicular to the X-axis and the Y-axis. The directions parallel to the X-axis, Y-axis, and Z-axis may be referred to as the X-direction, Y-direction, and Z-direction, respectively.

Magnetic field detection portion 31 of magnetic field detection element 3 is composed of a magnetoresistance effect element (for example, an AMR element, a TMR element, or a GMR element) or a Hall element. Magnetic field detection unit 31 passes through the central axis of rotation C (Z-axis) but may be slightly offset from the Z-axis. Magnetic field detection element 3 is provided on substrate 32, and the drive voltage and output signal of magnetic field detection element 3 are input and output through substrate 32. Magnetic field detection element 3 measures the magnetic field strength in two orthogonal directions (e.g., the X-direction and Y-direction) in the XY coordinate system, but may also measure the magnetic field strength in one direction (e.g., the X-direction).

Magnetic sensor 1 generally operates as follows: The direction of the magnetic field applied to magnetic field detection element 3 changes as first to fourth magnets M1 to M4 rotate. That is, the strength of the magnetic field applied in the magnetic sensing direction of magnetic field detection element 3 changes in accordance with the rotation of first to fourth magnets M1 to M4. By detecting this change in magnetic field strength, magnetic sensor 1 can detect the rotation angle of rotating shaft 2.

Arrangement of First to Fourth Magnets M1 to M4

As shown in FIG. 2, first to fourth magnets M1 to M4 are located in first to fourth quadrants I to IV, respectively, in the XY coordinate system. First to fourth magnets M1 to M4 have first to fourth element-facing surfaces S1 to S4, respectively, that face magnetic field detection element 3. First to fourth element-facing surfaces S1 to S4 each have a long and narrow rectangular shape having long side SA and short side SB. First to fourth element-facing surfaces S1 to S4 have first to fourth long axes A1 to A4, respectively, that are each parallel to respective long sides SA. First element-facing surface S1 and second element-facing surface S2 are N-poles, and third element-facing surface S3 and fourth element-facing surface S4 are S-poles. First element-facing surface S1 and second element-facing surface S2 may be S-poles, and third element-facing surface S3 and fourth element-facing surface S4 may be N-poles. That is, first element-facing surface S1 and second element-facing surface S2 have the same polarity, and third element-facing surface S3 and fourth element-facing surface S4 have a polarity different from that of first and second element-facing surfaces S1 and S2. Yoke 5 is in contact with back surfaces S5 (see FIG. 1B) of first to fourth element-facing surfaces S1 to S4 of first to fourth magnets M1 to M4.

H shown in FIG. 1B is a parameter indicating the position of magnetic field detection element 3 in the Z-direction (the direction parallel to the rotation center axis C) and is the Z-direction distance between first to fourth element-facing surfaces S1 to S4 and magnetic field detection portion 31 of magnetic field detection element 3. In this embodiment, first to fourth element-facing surfaces S1 to S4 are located at the same position in the Z-direction, but may be located at different positions.

Referring to FIG. 2, straight lines that are parallel to first to fourth long axes A1 to A4, that have the origin 0 as their ends, and that pass through first to fourth quadrants I to IV are defined as first to fourth imaginary lines B1 to B4, respectively. In other words, first to fourth imaginary lines B1 to B4 are straight lines translated parallel to first to fourth long axes A1 to A4, respectively, with the origin 0 as an end point and that pass through first to fourth quadrants I to IV. The angles that first to fourth imaginary lines B1 to B4 make in the counterclockwise direction with respect to boundary line BX (in the portion of the X-axis where $X \geq 0$) between first quadrant I and fourth quadrant IV are defined as θ1 to θ4, respectively. In this embodiment, angle θ1 is 0 degrees or more and 90 degrees or less, angle θ2 is 90 degrees or more and 180 degrees or less, angle θ3 is 180 degrees or more and 270 degrees or less, and angle θ4 is 270 degrees or more and 360 degrees or less.

First long axis A1 and second long axis A2 are line-symmetric with respect to the Y-axis, and third long axis A3 and fourth long axis A4 are line-symmetric with respect to the Y-axis. First long axis A1 and fourth long axis A4 are line-symmetric with respect to the X-axis, and second long axis A2 and third long axis A3 are line-symmetric with respect to the X-axis. That is, if $\alpha 2=180$ degrees$-\theta 2$, $\alpha 3-\theta 3-180$ degrees, and $\alpha 4=360$ degrees$-\theta 4$, then $\theta 1=\alpha 2=\alpha 3=\alpha 4$. Furthermore, centers C1 to C4 of first to fourth element-facing surfaces S1 to S4 of first to fourth magnets M1 to M4 may lie on single circle CC centered on the origin 0 in the XY coordinate system. With the above configuration, the magnetic flux is linearly symmetrical with respect to the X-axis and Y-axis, and the Z-direction component of the magnetic flux in magnetic field detection element 3 is substantially zero.

As described above, in this embodiment, once angle θ1 is determined, angles θ2 to θ4 are also determined. Therefore, the following description will focus on angle θ1. However, within the above range, angles θ1 to θ4 may be different from each other. Furthermore, centers C1 to C4 of first to fourth element-facing surfaces S1 to S4 of first to fourth magnets M1 to M4 do not have to be on a single circle with the origin 0 as its center.

EFFECTS OF THIS EMBODIMENT

Figure 3A:
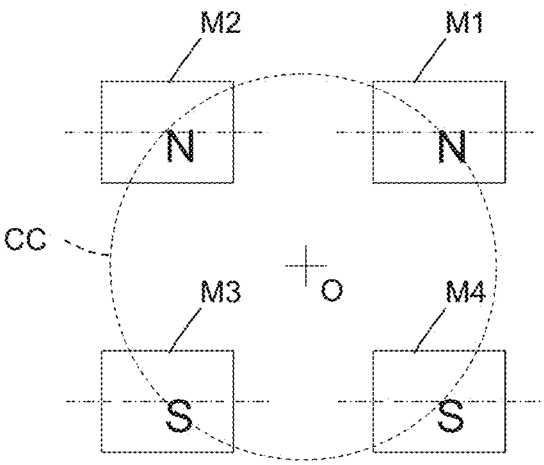
FIGS. 3A to 3E are plan views showing several example arrangements of the first to fourth magnets.
Figure 3B:
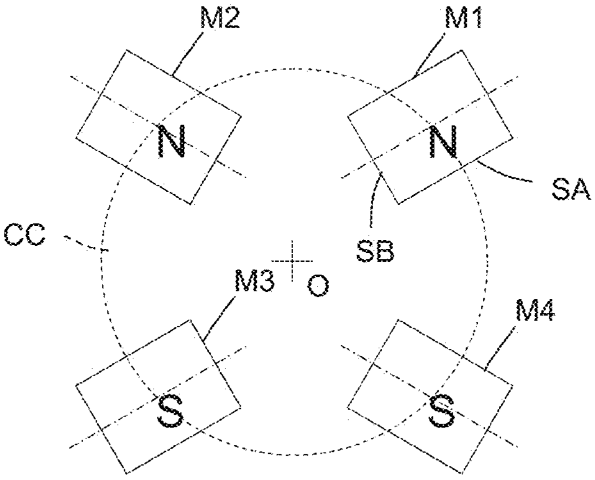
Figure 3C:
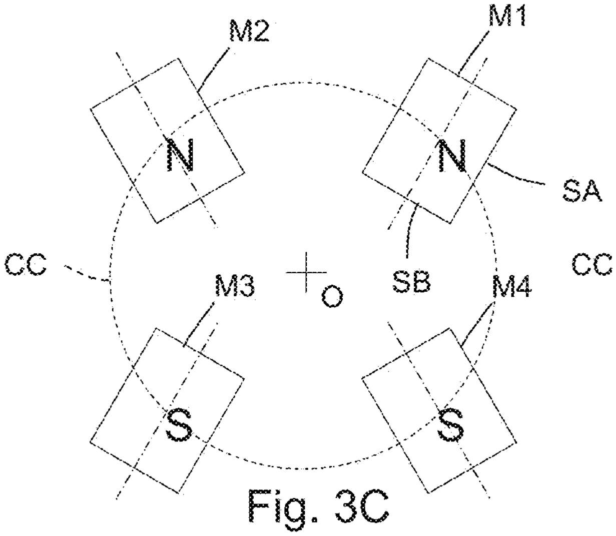
Figure 3D:
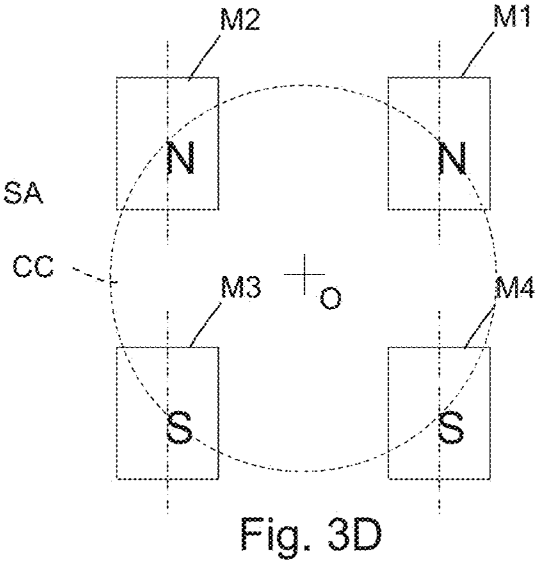
Figure 3E:
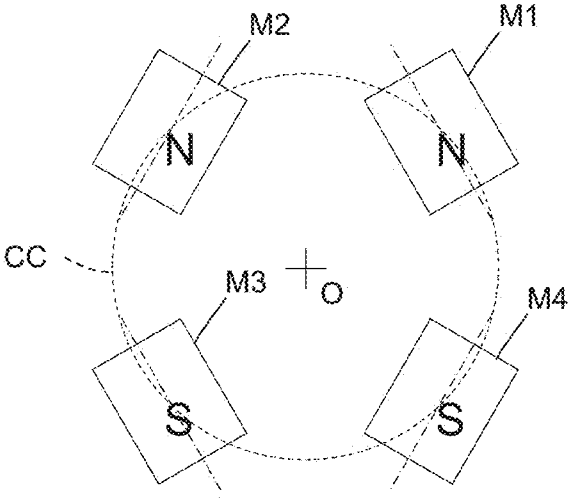

FIGS. 3A to 3E are views similar to FIG. 2 showing the arrangement of first to fourth magnets M1 to M4 with respect to various angles θ1. FIG. 3A shows a case where θ1=0 degrees, FIG. 3B shows a case where θ1=30 degrees, FIG. 3C shows a case where θ1=60 degrees, and FIG. 3D shows a case where θ1=90 degrees. FIG. 3E is a comparative example, showing a case where θ1=120 degrees. As shown in FIGS. 3B and 3C, angle θ1 may be greater than 0 degrees and less than 90 degrees, angle θ2 may be greater than 90 degrees and less than 180 degrees, angle θ3 may be greater than 180 degrees and less than 270 degrees, and angle θ4 may be greater than 270 degrees and less than 360 degrees. For example, in the configurations shown in FIGS. 3B and 3C, short sides SB of first to fourth element-facing surfaces S1 to S4 face rotation center axis C (origin 0).

FIG. 4 shows a comparison of this embodiment having four magnets M1 to M4 with other configurations. The magnet of Comparative Example 1 is disk-shaped, is magnetized as a whole in the radial direction, and has two semicircular portions, one serving as an N-pole and the other serving as an S-pole. The magnet of Comparative Example 2 is disk-shaped, has two semicircular portions each magnetized in the thickness direction, with the element-facing surface of one semicircular portion being the N-pole and the element-facing surface of the other semicircular portion being the S-pole. Comparative Example 3 has two rectangular parallelepiped magnets, with the element-facing surface of one magnet being the N-pole and the element-facing surface of the other magnet being the S-pole. Working Example 1 corresponds to a case where θ1=0 degrees in the above-mentioned configuration.

In Comparative Example 1, the magnetic flux mainly enters and exits from the side surfaces of the magnet, so the shape of the magnetic flux tends to be flat along the magnet. Therefore, applying a sufficient magnetic field to magnetic field detection element 3 becomes difficult when distance H in the Z-direction between the magnet and magnetic field detection element 3 is large. In Comparative Example 2, the magnetic flux mainly enters and exits from the element-facing surface of the magnet, but since the magnetic flux path is short, the shape tends to be small in the Z-direction. Therefore, when distance H in the Z-direction between the magnet and magnetic field detection element 3 is large, applying a sufficient magnetic field to magnetic field detection element 3 becomes difficult. In Comparative Example 3, magnetic flux mainly enters and exits from the element-facing surfaces of the magnets. Because the two magnets are separated, the magnetic flux is dispersed in the Z-direction. Therefore, a sufficient magnetic field can be applied to magnetic field detection element 3 regardless of distance H in the Z-direction between the magnet and magnetic field detection element 3. Working Example 1 shows the same tendency as Comparative Example 3.

Next, the angle measurement error will be described. Since magnetic field detection element 3 and first to fourth magnets M1 to M4 are attached to different structures, there is a possibility that misalignment may occur between these components, for example, during assembly. Here, the positional deviation in the XY coordinate system is considered. Since first to fourth magnets M1 to M4 rotate around the Z axis, the positional deviation can be considered as the radial deviation of magnetic field detection element 3 from the Z-axis. Therefore, for Comparative Examples 1 to 3 and Working Example 1, magnetic field detection element 3 is shifted radially from the Z-axis by 1 mm, and the rotation angle detected by magnetic sensor 1 is obtained while changing the rotation angle of first to fourth magnets M1 to M4. The maximum value of the difference between the calculated rotation angle and the actual rotation angle is then determined as the angle measurement error. The above calculation is performed for H=3, 4, 5, 6, 7, and 8 (mm). The dimensions and volumes of the magnets used in the calculations are shown in FIG. 4.

Figure 5:
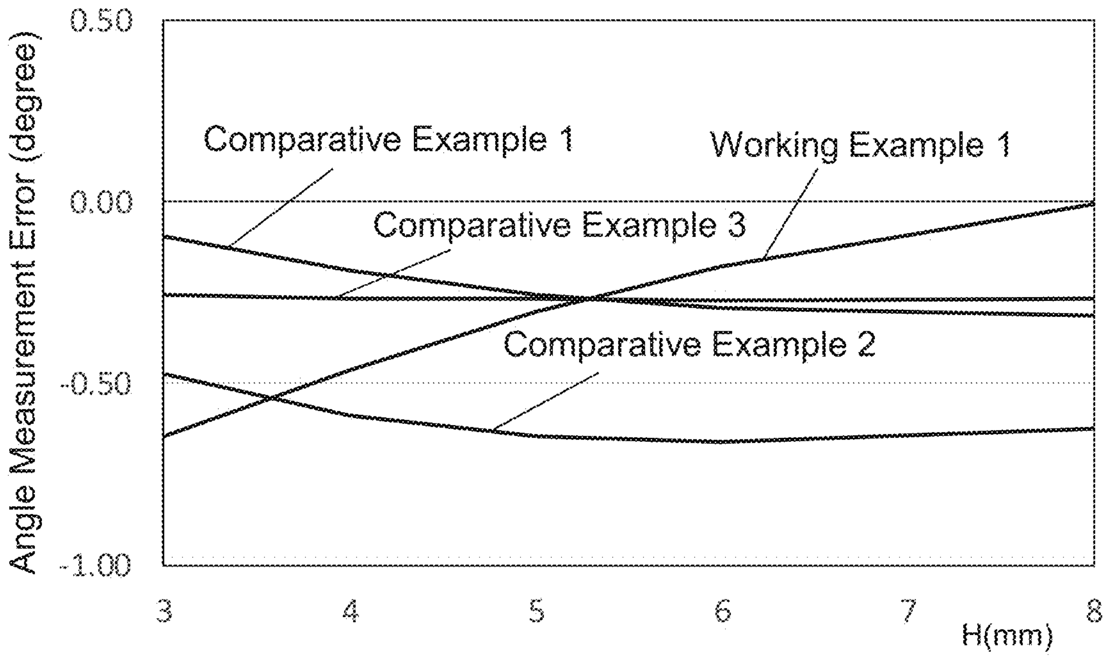
FIG. 5 is a graph showing the relationship between distance H in the Z-direction between the magnet and the element shown in FIG. 4 and the angle measurement error.

FIG. 5 shows the angle measurement error thus obtained for Comparative Examples 1 to 3 and Working Example 1. In Comparative Examples 1 and 2, the angle measurement error increased as distance H in the Z-direction increased. In Comparative Example 2 the absolute value of the angle measurement error is particularly large. In Comparative Example 3, the angle measurement error is almost constant regardless of distance H in the Z-direction. In Working Example 1, the angle measurement error decreased as distance H in the Z-direction increased, and the angle measurement error became almost zero when H=8 mm. From these examples, it was confirmed that Example 1 is effective when distance H in the Z-direction is relatively large.

Aspect Ratio of Magnet

Figure 6A:
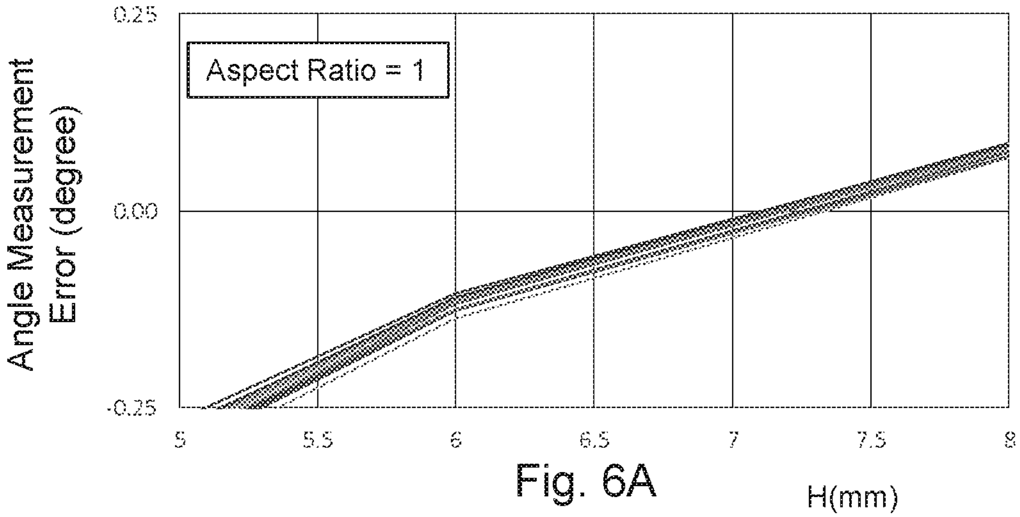
FIGS. 6A to 6C are graphs showing the relationship among angle θ1, distance H in the Z-direction, and angle measurement error.
Figure 6B:
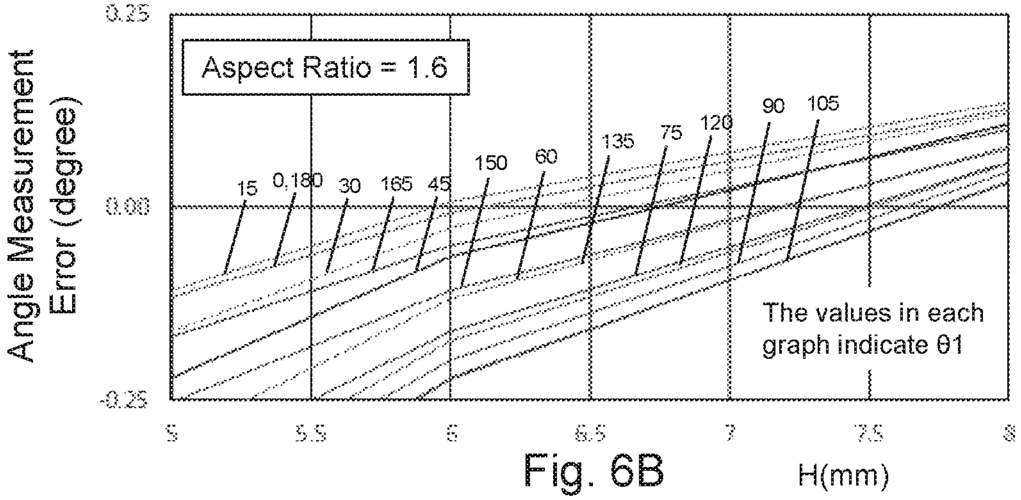
Figure 6C:
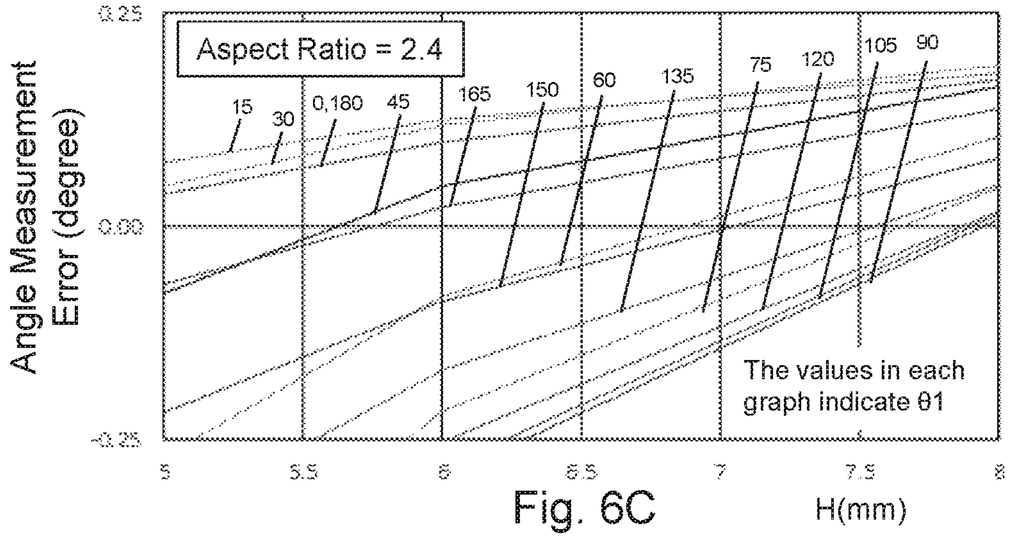

Next, a description will be given of a suitable range for angle θ1 and the aspect ratio of first to fourth element-facing surfaces S1 to S4 (the ratio of the length of long side SA to the length of short side SB of first to fourth element-facing surfaces S1 to S4). FIGS. 6A to 6C show the relationship among the angle measurement error due to the positional deviation of magnetic field detection element 3, angles θ1 to θ4, and distance H in the Z-direction. FIG. 6A shows a case where the aspect ratio=1, FIG. 6B shows a case where the aspect ratio=1.6, and FIG. 6C shows a case where the aspect ratio=2.4. In each figure, angle θ1 is changed from 0 degrees to 180 degrees in increments of 15 degrees. In a case where the aspect ratio=1, although angle θ1 is not shown, there is almost no change in the angle measurement error even when angle θ1 is changed. When the aspect ratio=1.6, the angle measurement error changes when angle θ1 is changed, and when the aspect ratio=2.4, the angle measurement error changes even more greatly when angle θ1 is changed. This shows that angle measurement error is more easily adjusted when first to fourth element-facing surfaces S1 to S4 are rectangular (with an aspect ratio exceeding 1) with long side SA and short side SB than when first to fourth element-facing surfaces S1 to S4 are square.

Figure 7:
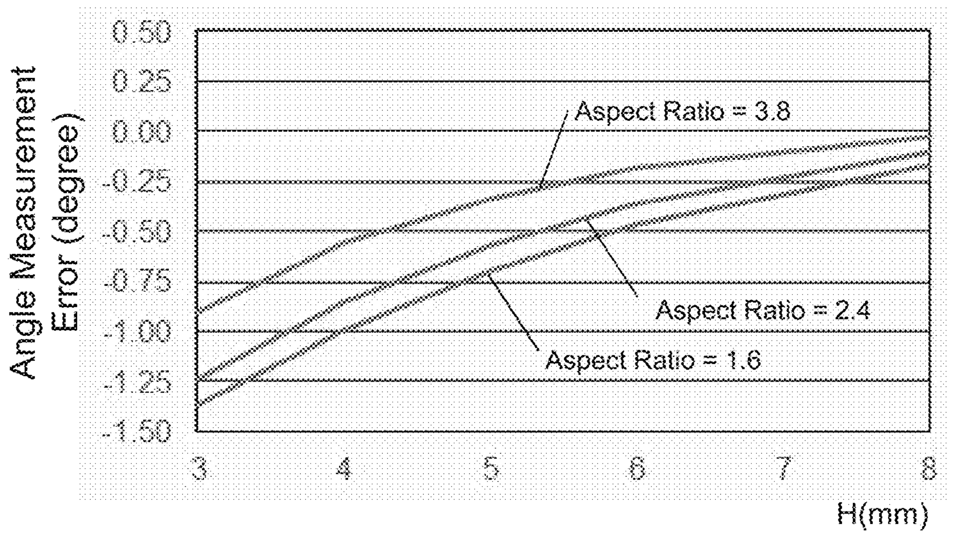
FIG. 7 is a graph showing the relationship among aspect ratio, distance H in the Z-direction, and the angle measurement error.

FIG. 7 shows an example of the calculation of the relationship among the aspect ratio, distance H in the Z-direction, and the angle measurement error when θ1=30 degrees. Angle measurement error is more easily reduced as the aspect ratio increases. However, the possibility of damage to first to fourth magnets M1 to M4 increases as the aspect ratio increases, and handling when fixing first to fourth magnets M1 to M4 to yoke 5 may become more difficult. FIG. 7 shows examples of aspect ratios of 1.6 and 2.4, but the aspect ratio may vary from 1.2 to 2.5.

Angle of Magnet

Referring to FIG. 6B and FIG. 6C, the graphs of the angle measurement error show an upward trend as distance H in the Z-direction increases. The angle measurement error at a maximum when θ1 is in the vicinity of 0 to 15 degrees and at a minimum when θ1 is in the vicinity of 90 to 105 degrees, and the angle measurement error for θ1=180 degrees is roughly the same as the angle measurement error for θ1=0.

Since the range of θ1=0 to 90 degrees and the range of θ1=90 to 180 degrees show roughly the same tendency, there is not much difference between selecting the range of θ1=0 to 90 degrees or the range of θ1=90 to 180 degrees as the adjustment range of angle θ1 for reducing angle measurement error. A comparison of FIG. 6B with FIG. 6C shows that as the aspect ratio increases, the points at which the angle measurement error becomes zero tend to vary more widely in the horizontal axis direction (distance H in the Z-direction). This shows that ease of adjusting distance H in the Z-direction to reduce angle measurement error increases with the aspect ratio.

Figure 8A:
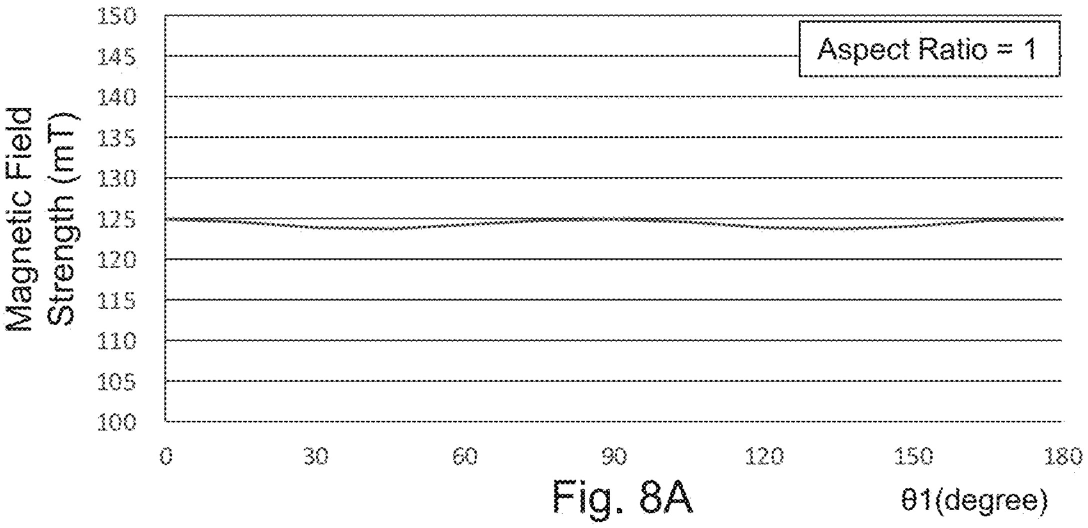
FIGS. 8A to 8C are graphs showing the relationship between angle θ1 and magnetic field strength.
Figure 8B:
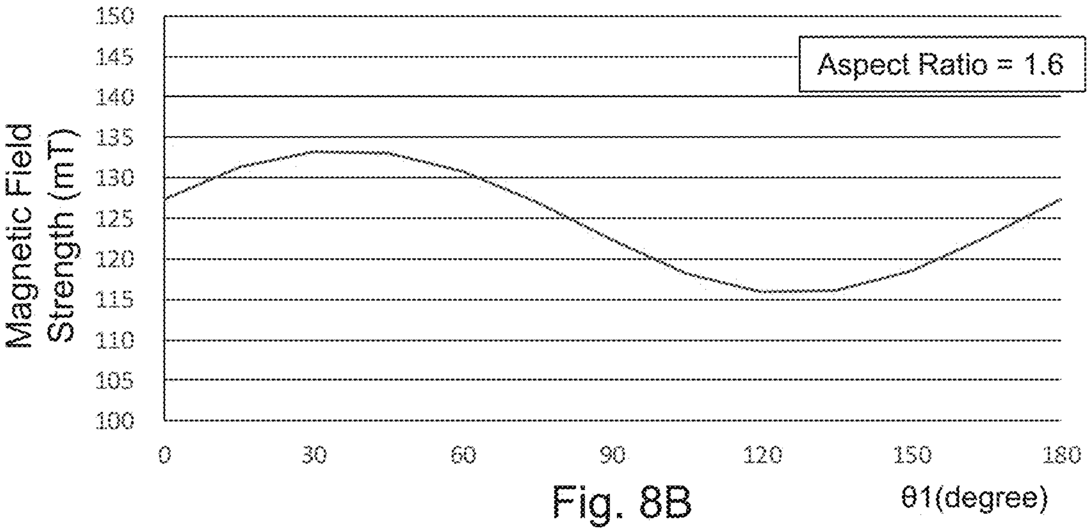
Figure 8C:
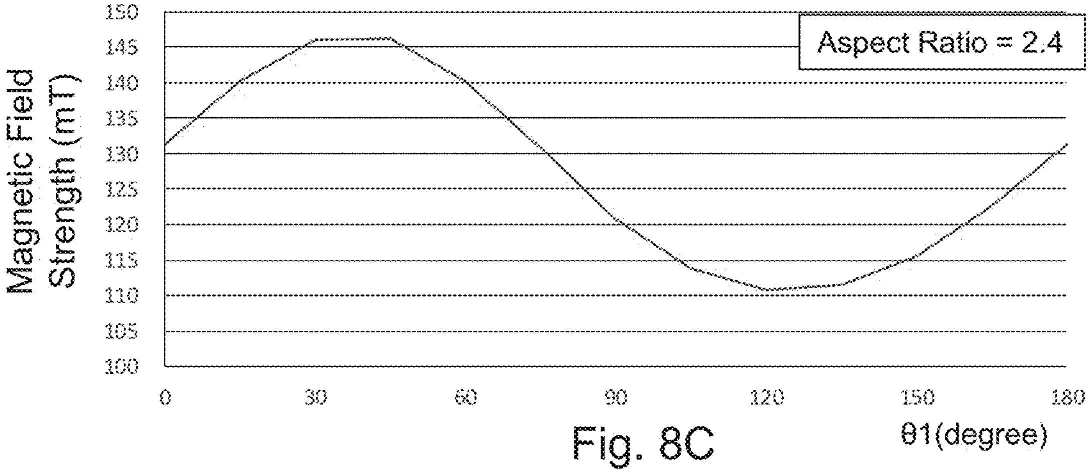

FIGS. 8A to 8C show the relationship between distance H in the Z-direction and the magnetic field strength at the installation position of magnetic field detection element 3. FIG. 8A shows a case where the aspect ratio=1, FIG. 8B shows a case where the aspect ratio=1.6, and FIG. 8C shows a case where the aspect ratio=2.4. In each figure, angle θ1 is changed from 0 degrees to 180 degrees in increments of 15 degrees. When the aspect ratio=1, the magnetic field strength is almost constant. When the aspect ratio=1.6, the maximum is reached when θ1 is in the vicinity of 30 to 40 degrees, and the minimum is reached when θ1 is in the vicinity of 120 to 130 degrees. When the aspect ratio=2.4, the same tendency is observed as when the aspect ratio=1.6, and the maximum value of the magnetic field strength is larger than when the aspect ratio=1.6. This shows that the adjustment range of angle θ1 is preferably θ1=0 to 90 degrees and more preferably to θ1=20 degrees or more and 50 degrees or less for achieving a reduction of angle measurement error and an increase in the magnetic field strength.

Figure 9A:
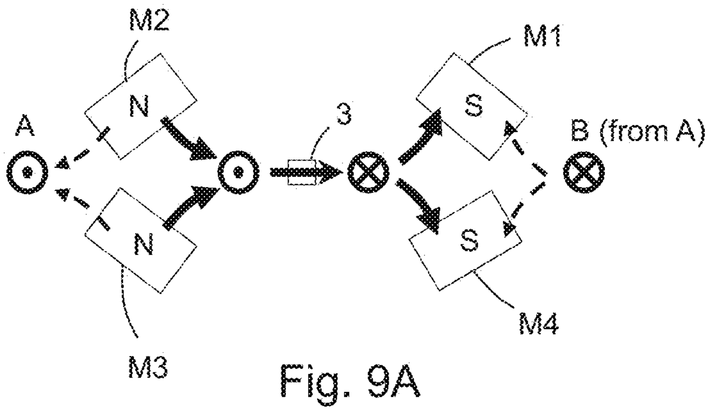
FIGS. 9A to 9D are conceptual diagrams showing the reason why the magnetic field strength increases in the range of θ1=0 to 90 degrees.
Figure 9B:
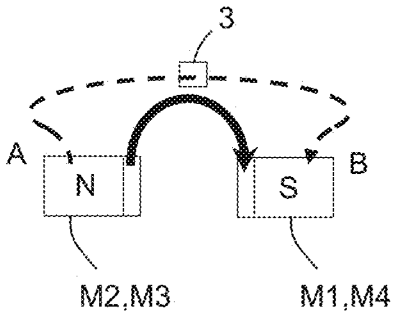
Figure 9C:
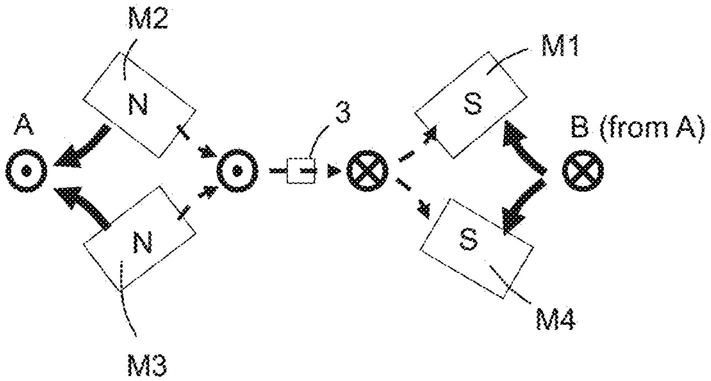
Figure 9D:
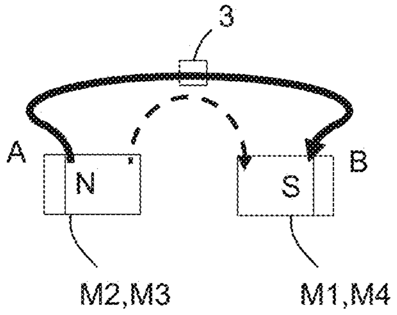

FIGS. 9A to 9D conceptually show why the magnetic field strength increases in the range of θ1=0 to 90 degrees. FIG. 9A shows a plan view of a magnet arrangement (of a comparative example) in which θ1 is greater than 90 degrees and less than 180 degrees, and FIG. 9B shows a side view thereof. FIG. 9C shows a plan view of the magnet arrangement (of this embodiment) in which θ1 is between 0 degrees and 90 degrees, and FIG. 9D shows a side view thereof. Since the amount of magnetic flux is considered to be proportional to the length of the sides of the element-facing surface, the magnetic flux passing through long side SA is shown by thick lines, and the magnetic flux passing through short side SB is shown by thin broken lines. In these figures, only the magnetic flux passing near magnetic field detection element 3 is shown. In the comparative examples, the liens of magnetic flux emitted from long sides SA of the two N-poles travel toward the S-pole while repelling each other and are absorbed by long sides SA of the two S-poles. Since the path of the magnetic flux is relatively short, it does not rise very far upward in the Z-direction, and when distance H in the Z-direction is large, the magnetic field strength at magnetic field detection element 3 becomes small.

The lines of the magnetic flux emitted from short sides SB of the two N-poles repel each other while first moving in a direction away from magnetic field detection element 3, then reverse direction at point A and move toward the S-pole, and after passing the S-pole, reverse direction at point B and are absorbed by short sides SB of the two S-poles. Since the path of this magnetic flux is relatively long, it rises upward in the Z-direction, and the magnetic field strength at magnetic field detection element 3 becomes large. The magnetic field strength in magnetic field detection element 3 is the sum of these lines of magnetic flux emitted from two short sides SB, but since the magnetic flux emanating from short side SB is small, the sum is small. In contrast, although the path of magnetic flux in the embodiment is the same as in the comparative example, more magnetic flux emanates from long side SA and the magnetic field strength in magnetic field detection element 3 is therefore also greater.

Design Method of Magnetic Sensor 1

As described above, the angle measurement error depends on distance H in the Z-direction, but distance H in the Z-direction is restricted by both the configuration of rotating body 2 on which magnetic sensor 1 is attached and the surrounding arrangement. Distance H in the Z-direction can be difficult to adjust and is often a given. On the other hand, as shown in FIGS. 6B and 6C, the angle measurement error can be reduced to zero by adjusting angles θ1 to θ4. Specifically, the relationship among the angle measurement error, angles θ1 to θ4, and distance H in the Z-direction is obtained as shown in FIGS. 6A to 6C and 7, and angles θ1 to θ4 can be determined so that the angle measurement error is zero depending on the position of magnetic field detection element 3 (distance H in the Z-direction). It goes without saying that magnetic sensor 1 manufactured according to this design method falls within the scope of the present disclosure.

As described above, according to the present disclosure, a magnetic sensor can be provided in which detection error due to misalignment between a magnet and a magnetic field detection element is reduced and a large magnetic field can be applied to the magnetic field detection element.

LIST OF REFERENCE NUMERALS

1 magnetic sensor
2 rotating body (rotating shaft)
3 magnetic field detection element
5 yoke
6 sealing material
100 assembly
A1 to A4 first to fourth long axes
B1 to B4 first to fourth imaginary lines
C rotational axis
M1 to M4 first to fourth magnets
S1 to S4 first to fourth element-facing surfaces
θ1 to θ4 angles

The invention claimed is:

1. A magnetic sensor, comprising:

first to fourth magnets that are rotatable around a central axis of rotation and that have a fixed positional relationship with each other; and a magnetic field detecting element, wherein:

in an XY coordinate system that is perpendicular to the central axis of rotation and that passes through the origin, the first to fourth magnets are located in first to fourth quadrants, respectively, the first to fourth magnets include first to fourth element-facing surfaces, respectively, that face the magnetic field detection element, the first to fourth element-facing surfaces have elongated shapes having first to fourth long axes, respectively, the first element-facing surface and the second element-facing surface have the same polarity, and the third element-facing surface and the fourth element-facing surface have a polarity different from that of the first and second element-facing surfaces;

when straight lines that are parallel to the first to fourth long axes, that have the origin as their ends, and that pass through the first to fourth quadrants are defined as first to fourth imaginary lines and the angles that the first to fourth imaginary lines make counterclockwise with respect to the boundary line between the first and fourth quadrants are θ1 to θ4, θ1 is greater than or equal to 0 degrees and less than or equal to 90 degrees, θ2 is greater than or equal to 90 degrees and less than or equal to 180 degrees, θ3 is greater than or equal to 180 degrees and less than or equal to 270 degrees, and θ4 is greater than or equal to 270 degrees and less than or equal to 360 degrees; and the magnetic field detecting element passes through the central axis of rotation.

2. The magnetic sensor according to claim 1, wherein θ1 is greater than 0 degrees and less than 90 degrees, θ2 is greater than 90 degrees and less than 180 degrees, θ3 is greater than 180 degrees and less than 270 degrees, and θ4 is greater than 270 degrees and less than 360 degrees.

3. The magnetic sensor according to claim 2, wherein θ1=180 degrees−θ2=θ3−180 degrees=360 degrees−θ4.

4. The magnetic sensor according to claim 3, wherein θ1 is equal to or greater than 20 degrees and equal to or less than 50 degrees.

5. The magnetic sensor according to claim 1, wherein short sides of the first to fourth element-facing surfaces face the origin.

6. The magnetic sensor according to claim 1, wherein in the XY coordinate system, centers of the first to fourth element-facing surfaces are on a circle having the origin as its center.

7. The magnetic sensor according to claim 1, further comprising a soft magnetic material that contacts a back surface of each of the first to fourth element-facing surfaces of the first to fourth magnets.

8. The magnetic sensor according to claim 1, further comprising a sealant that seals the first to fourth magnets.

9. An assembly, comprising:

the magnetic sensor according to claim 1;

a rotating shaft to which the first to fourth magnets of the magnetic sensor are fixed; and a motor or engine connected to the rotating shaft and configured to rotate the rotating shaft.

10. A method for designing a magnetic sensor, the magnetic sensor comprising:

first to fourth magnets that are rotatable around a central axis of rotation and that have a fixed positional relationship with each other; and a magnetic field detecting element that passes through the central axis of rotation, wherein:

in an XY coordinate system that is perpendicular to the central axis of rotation and that passes through the origin, the first to fourth magnets are located in first to fourth quadrants, respectively, the first to fourth magnets include first to fourth element-facing surfaces, respectively, that face the magnetic field detecting element, the first to fourth element-facing surfaces have elongated shapes having first to fourth long axes, respectively, the first element-facing surface and the second element-facing surface have the same polarity, and the third element-facing surface and the fourth element-facing surface have a polarity different from that of the first and second element-facing surfaces, the method comprising:

defining straight lines that are parallel to the first to fourth long axes, that have the origin as their ends, and that pass through the first to fourth quadrants as first to fourth imaginary lines, defining the angles that the first to fourth imaginary lines make counterclockwise with respect to the boundary line between the first and fourth quadrants as θ1 to θ4, determining a relationship between angle measurement error that is a difference between a calculated rotation angle of a rotating body to which the first to fourth magnets are fixed and an actual rotation angle of the rotating body and, θ1 to θ4 at a plurality of positions of the magnetic field detecting element in a direction parallel to the central axis of rotation; and determining θ1 to θ4 based on the position of the magnetic field detecting element in the direction parallel to the central axis of rotation so that the angle measurement error becomes zero.

11. A magnetic sensor manufactured by the method for designing a magnetic sensor according to claim 10.

12. A magnetic sensor, comprising:

first to fourth magnets that are rotatable around a central axis of rotation and that have a fixed positional relationship with each other; and a magnetic field detecting element, wherein:

in an XY coordinate system that is perpendicular to the central axis of rotation and that passes through the origin, the first to fourth magnets are located in first to fourth quadrants, respectively, the first to fourth magnets include first to fourth element-facing surfaces, respectively, that face the magnetic field detection element, the first to fourth element-facing surfaces have elongated shapes having first to fourth long axes, respectively, the first element-facing surface and the second element-facing surface have the same polarity, and the third element-facing surface and the fourth element-facing surface have a polarity different from that of the first and second element-facing surfaces;

when straight lines that are parallel to the first to fourth long axes, that have the origin as their ends, and that pass through the first to fourth quadrants are defined as first to fourth imaginary lines and the angles that the first to fourth imaginary lines make counterclockwise with respect to the boundary line between the first and fourth quadrants are θ1 to θ4, θ1 is greater than or equal to 0 degrees and less than or equal to 90 degrees, θ2 is greater than or equal to 90 degrees and less than or equal to 180 degrees, θ3 is greater than or equal to 180 degrees and less than or equal to 270 degrees, and θ4 is greater than or equal to 270 degrees and less than or equal to 360 degrees; and the first to fourth element-facing surfaces are rectangular having long sides and short sides, and a ratio of the length of the long sides to the length of the short sides is 1.2 or more and 2.5 or less.

13. The magnetic sensor according to claim 12, wherein θ1 is greater than 0 degrees and less than 90 degrees, θ2 is greater than 90 degrees and less than 180 degrees, θ3 is greater than 180 degrees and less than 270 degrees, and θ4 is greater than 270 degrees and less than 360 degrees.

14. The magnetic sensor according to claim 13, wherein θ1=180 degrees−θ2=θ3−180 degrees=360 degrees−θ4.

15. The magnetic sensor according to claim 14, wherein θ1 is equal to or greater than 20 degrees and equal to or less than 50 degrees.

16. The magnetic sensor according to claim 12, wherein short sides of the first to fourth element-facing surfaces face the origin.

17. The magnetic sensor according to claim 12, wherein in the XY coordinate system, centers of the first to fourth element-facing surfaces are on a circle having the origin as its center.

18. The magnetic sensor according to claim 12, further comprising a soft magnetic material that contacts a back surface of each of the first to fourth element-facing surfaces of the first to fourth magnets.

19. The magnetic sensor according to claim 12, further comprising a sealant that seals the first to fourth magnets.

20. An assembly, comprising:

the magnetic sensor according to claim 12;

a rotating shaft to which the first to fourth magnets of the magnetic sensor are fixed; and a motor or engine connected to the rotating shaft and configured to rotate the rotating shaft.

* * * * *